Jan. 23, 1968 J. N. PEARSE 3,365,622
CAPACITOR CONTROLLED RELAY FLIP-FLOP
Filed June 10, 1965
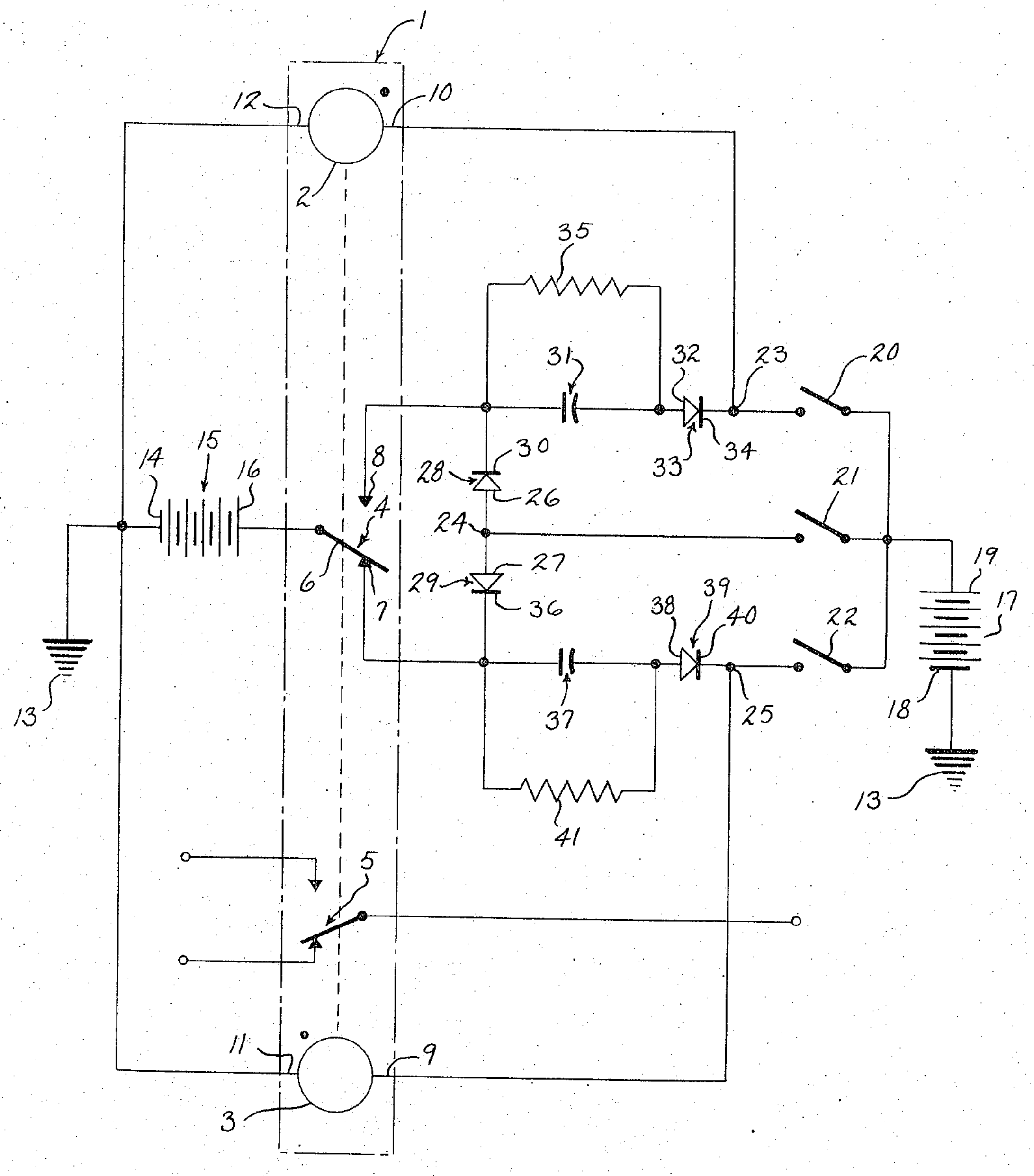
INVENTOR
JAMES N. PEARSE
BY Thomas O. Kloehn
ATTORNEY United States Patent Office 3,365,622
Patented Jan. 23, 1968

3,365,622
CAPACITOR CONTROLLED RELAY FLIP-FLOP

James N. Pearse, Menomonee Falls, Wis., assignor to Allen-Bradley Company, Milwaukee, Wis., a corporation of Wisconsin Filed June 10, 1965, Ser. No. 462,917
6 Claims. (Cl. 317—140)

ABSTRACT OF THE DISCLOSURE

The flip-flop has a single relay with a pair of oppositely polarized coils to actuate a common contact into engagement with one or another of two stationary contacts. Each of the coils has one end grounded, and an opposite end connected through a capacitor, a blocking diode and a common input switch to D-C source. A biasing source is connected to the common contact, and each of the stationary contacts is connected to one of the blocking diodes so they may be reverse biased to block input signals from the common input switch to first one and then the other of the coils.

The present invention relates to relay flip-flops. More specifically, the present invention resides in a flip-flop that utilizes a relay having parallel connected energizing and deenergizing coils to actuate a contact means; that has in series with each coil a blocking diode and a capacitor, the blocking diodes being connected in common to receive an input signal; and that has a bias voltage source connected to the relay contact means, which will alternately connected the source to one or the other of the blocking diodes to reverse bias those diodes into a nonconducting state.

Flip-flops are bistable electrical deviecs that have broad and numerous application in computers, and throughout those many and varied systems that have come to be popularly subsumed under the term "automation." Electronic and semiconductor flip-flops are generally employed where high speed operation is required, but such flip-flops are limited in that frequently they will operate on only one input signal and provide only a single output signal, and that output signal is frequently unusable without amplification or other modification. Those limitations result when the input and output are not isolated from one another.

The present invention provides a flip-flop in which the input and output are entirely isolated so that there is no need to amplify or buffer the output. Moreover, a flip-flop according to the present invention may operate on numerous different inputs and control a multitude of output signals. Also, a flip-flop according to the present invention has a permanent memory that can survive power loss, so that the flip-flop will permanently remain in whatever condition it had assumed at the time of the power loss. These operational advantages are achieved with extraordinary circuit economy in that a flip-flop embodying the present invention employs only a single relay with two coils and contact means, two capacitors and a pair of blocking diodes. As a result, a flip-flop embodying the present invention is reliable, stable and relatively inexpensive.

The applications of a flip-flop embodying the present invention are numerous in the general field of automatizing various industrial operations. The present invention provides very unusual type of operation in that it operates asynchronously on the leading edge of an input signal. Normally, asynchronous operation is associated with trailing edge logic, and the prior art devices that operate on the leading edge will usually run away unless they are triggered by a timed clocking signal. However the present invention requires no clocking signal for its leading edge operation. In addition, the present invention may be used wherever it is desired to control a multitude of outputs from a multitude of input signals, as for example in a lighting system for a building which would permit all of the lights of the building to be controlled from any one of a large number of light switches located throughout the building.

Accordingly, it is an object of the present invention to provide a flip-flop having isolated output and input circuits.

It is another object of the present invention to provide a relay-flip-flop capable of utilizing a multitude of input signal sources to control a multitude of output signals.

It is another object of the present invention to provide a flip-flop manifesting extraordinary circuit economy.

It is another object of the present invention to provide a relay flip-flop that is at once stable, reliable and inexpensive.

It is another object of the present invention to provide a flip-flop that has a permanent memory capable of surviving power failures.

It is another object of the present invention to provide a flip-flop that operates on the leading edge of an input signal, but nevertheless provides asynchronous operation so that a clocking signal is not required.

The foregoing and other objects and advantages will be apparent from the written description to follow. In the course of that decription, reference will be made to the accompanying drawing which forms a part of the disclosure and which illustrates the best method known of carrying out the present invention. The description sets forth the manner and process of making and using the invention in such full, clear, concise and exact terms as to enable any person skilled in the art to make and use the same, but the preferred embodiment of the present invention described herein is not to be deemed representative of the full scope of the invention in all of its forms. On the contrary, the subject matter regarded as the invention is particularly pointed out and distinctly claimed at the conclusion of the specification in the numbered claims set forth there.

In the drawing:

The single figure is a schematic diagram of a preferred embodiment of the invention providing complement set and reset input sources to control a single output.

Referring now to the drawing, a relay 1 is represented by components illustrated inside a broken line box, and these include an energizing coil 2 at the top, a deenergizing coil 3 at the bottom, control contact means 4 in the center, and output contact means 5, which appear in the drawing between the control contact means 4 and the deenergizing coil 3. Both contact means shown are single-pole-double-throw type contacts 4 and 5 and in the drawing they are shown in a normal condition. The control contact means 4 has a common movable contact 6 and two stationary contacts 7 and 8, and the output contact means 5 has a similar structure.

The energizing coil 2 and the deenergizing coil 3 are so denominated because of their functions in the relay 1, which functions are illustrated in the drawing by the polarity dot convention. A positive signal entering the deenergizing coil 3 from its input end 9, enters opposite from the polarity dot shown in the drawing and the field generated by such a signal would tend to retain the contact means 4 and 5 in the condition shown in the drawing. However, a positive signal entering the energizing coil 2 at its input end 10 enters adjacent the polarity dot shown in the drawing, and would have the effect of energizing the relay 1 to move the contact means 4 and 5 into the opposite condition from that shown in the drawing. In other words, an input signal to the energizing coil 2 would move the common contact 6 of the control contact means into an engagement with the upper stationary contact 8, and a subsequent input signal to the deenergizing coil 3 would restore the common contact 6 into its position shown in the drawing in contact with the lower stationary contact 7. Of course, the output contact means 5 function with the control contact means 4 in a corresponding manner.

The energizing coil 2 and the deenergizing coil 3 have their signal return ends 12 and 11 connected in common to a common ground 13 and to a negative pole 14 of a bias voltage source 15, which is represented in the drawing by the symbol for a battery to indicate the source of the unidirectional current source. A positive pole 16 of the bias source 15 is connected to the common movable contact 6 of the control contact means 4.

Turning now to the input side of the relay 1, on the far right-hand side of the drawing is an input signal source 17 represented by the symbol for a battery to indicate a unidirectional current source. The potential of the bias source 15 and the input signal source 17 should be equal, and preferably the same potential source should be used for both. However, to clarify this disclosure two separate and equal sources 15 and 17 are shown. The input signal source 17 has its negative pole 18 connected to the common ground 13 and its positive pole 19 is connected in common to a set input switch 20, a complement input switch 21 and a reset input switch 22. The set input switch 20 controls the flow of input signal to a set input terminal 23. In like fashion, the complement input switch 21 controls the flow of input signal to the complement input terminal 24, and the reset input switch 22 controls the flow of reset signal to a reset input terminal 25.

The complement input terminal 24 is connected to anodes 26 and 27 of blocking diodes 28 and 29, respectively. The energizing coil 2 circuit contains the blocking diode 28, which has its cathode 30 connected to one plate of a capacitor 31. The other plate of the capacitor 31 is connected to an anode 32 of a set isolating diode 33, which has its cathode 34 connected to the input end 10 of the energizing coil 2. A current limiting resistor 35 is connected in parallel with the capacitor 31 to provide a discharge path for the capacitor 31. The stationary contact 8 of the control contact means 4 for the relay 1 is connected into this energizing coil 2 circuit between blocking diode 28 and the capacitor 31.

The deenergizing coil 3 circuit has the cathode 36 of its blocking diode 29 connected to one plate of a second cacitor 37, the other plate of which is connected to an anode 38 of a reset isolating diode 39. The cathode 40 of the reset isolating diode 39 is connected to the input end 9 of the deenergizing coil 3. A current limiting resistor 41 is connected in parallel with the capacitor 37 to provide a discharge path for it. The lower stationary contact 7 of the control contact means 4 is connected into deenergizing coil 3 circuit between its blocking diode 29 and the capacitor 37.

The relay 1 is shown in the drawing in its normal or deenerized condition, and it may be energized by imposing a set input signal through the set switch 20 at the set terminal 23. When the set switch 20 is closed, a positive current passes from the positive pole 19 of the input signal source 17 through the set switch 20 to the set terminal 23, entering the energizing coil 2 of the relay 1 from an input end 10, passing out through the signal return end 12 and back through the common ground 13 to the negative pole 18 of the input signal source 17. Such a current through the energizing coil 2 produces a magnetic field drawing the moving contact 6 of the control contact means 4 (and, of course, the corresponding structure of the output contact means 5) into its energized position in contact with the upper stationary contact 8, where it is held by whatever latching means is utilized in the structure. The set isolating diode 33 prevents a set signal from following a spurious path of the capacitor 31 or through the current limiting resistor 35.

When the relay 1 is in the energized or set condition, it may be restored to the normal, deenergized condition by closing the reset switch 22 to impose a reset signal on the reset input terminal 25. The reset signal will enter the deenergizing coil 3 through its input signal end 9, passing out through the signal return end 11 to the common ground 13 and back to the negative pole 18 of the input signal source 17. Such a reset signal will induce a magnetic field about the deenergizing coil 3 such that the movable contact 6 of the control contact means 4 will be restored to its normal position in contact with the lower stationary contact 7, and it will have a corresponding effect upon the output contact means 5. Just as a set signal would have no effect upon the relay 1 if it were already in an energized condition, so the reset signal will have no effect upon the relay 1 if it is already in its normal deenergized condition as shown in the drawing.

Regardless of the condition of the relay 1, the closing of the complement input switch 21 to impose a complement signal on the complement signal terminal 24 will always cause the flip-flop to change condition. If the flip-flop is in the normal condition shown in the drawing, a complement signal to the complement input signal terminal 24 will find the blocking diode 29 in the deenergizing coil circuit reverse biased by the bias voltage source 15 through the control contact means 4 so as to be nonconducting to the input signal. Hence, the complement signal will pass through the blocking diode 28 to charge the first capacitor 31, and the capacitor charging current will continue through the set isolating diode 33 entering the energizing coil 2 from its input signal end, to energize the relay 1, closing the common moving contact 6 of the control contact means 4 against the upper stationary contact 8. In this condition, the bias voltage source 15 in conjunction with the capacitor 31 will reverse bias the first blocking diode 28 to block the input signal path through the energizing coil 2.

If the complement switch 21 remains closed, the complement signal will now hold the blocking diode 29 in the deenergizing circuit in its reverse biased condition by maintaining the charge on the capacitor 37, and the input signal will be blocked so that no further change in the condition of the flip-flop can occur. Thus the flip-flop will operate asynchronously, even though it also operates on the leading edge of the input signal. Such operation is contrary to most leading edge logic binaries, which operate synchronously only, requiring a clocking signal of limited duration to prevent them from running away.

With the flip-flop still in its set condition and the complement switch 21 still closed on the first input signal pulse, it is necessary to open the complement switch 21, terminating the first input signal pulse, before the flip-flop can be reset. When the complement input switch 21 is opened, the capacitor 37 in the deenergizing circuit discharges through the resistor 41 that is connected across it. After the capacitor 37 has discharged, the complement switch 21 may be closed and an input signal from the input source 17, finding the energizing blocking diode 28 reverse biased by the charge on its associated capacitor 31, will pass through the deenergized diode 29 to charge the deenergizing capacitor 37, and that capacitor charging current will energize the deenergizing coil 3 to reset the contact 4 to the condition shown in the drawing.

This embodiment may be used in counters and other similar sequentially operating series. In such an application a source of electrical pulses would probably be substituted for the combination of the input source 17 and switches 20, 21 and 22 shown here. However, the embodiment shown could also have direct applications as a unit. For example, if all of the wall switches for the lighting system of a building were connected to operate the input switches shown in the drawing, any one of the wall switches could control all of the lights in the building through the output contact means 5, and by adding additional output contact means any number of output circuits could also be controlled. Such an application might employ a 24 volt direct current supply voltage to operate the relay 1 which could then be a double-pole-double-throw, dual coil, one watt, latching relay. The current limiting resistors 35 and 41 would be 2 k ohm, one watt resistors, and the capacitors 31 and 37 would be 4 microfarad capacitors. The diodes would be TI–IN2069 diodes.

It will, of course, be apparent that the embodiment shown here plus the circuit parameters described are but illustrative of the invention, which may be embodied in numerous forms. Accordingly, the subject matter of the invention is not confined to the embodiment just described, but rather is set forth in the claims to follow.

I claim:

1. A relay flip-flop comprising the combination of
a latching relay having an energizing coil connected to receive an input signal through a first blocking diode and a first capacitor, a deenergizing coil connected to receive an input signal through a second blocking diode and a second capacitor, and contact means electro-magnetically actuated by said coils, said first and second blocking diodes being connected in common to receive said input signal;
and a biasing voltage source connected to said contact means;
said contact means being adapted to alternately complete biasing circuits from said biasing source to said first and second blocking diodes to simultaneously reverse bias said first blocking diode to block said input signal and unbias said second blocking diode to conduct said input signal, and alternately to simultaneously reverse bias said second blocking diode to block said input signal and unbias said first blocking diode to conduct said input signal.

2. A relay flip-flop comprising the combination of
first and second input signal paths connected in parallel across an input signal source;
said first input signal path having a first blocking diode, a first capacitor and an energizing coil of a latching relay connected in series;
said second input signal path having a second blocking diode, a second capacitor and a deenergizing coil of said relay connected in series;
a biasing supply voltage source;
and contact means of said relay electromagnetically actuated by said coils and adapted to connect said bias source to reverse bias said first blocking diode to block said first input signal but not reverse bias said second blocking diode, and alternately to not reverse bias said second blocking diode but to reverse bias said first blocking diode to block said second input signal path.

3. A relay flip-flop comprising the combination of
a latching relay having an energizing coil, a deenergizing coil and contact means electromagnetically actuated by said coils, each of said coils having an input end and a signal return end with said signal return end connected in common;
an input signal terminal connected to receive an input signal;
a first blocking diode and a first capacitor connected in series between said input terminal and said input end of said energizing coil;
a second blocking diode and a second capacitor connected in series between said input terminal and said input end of said deenergizing coil;
and a supply voltage source having its negative pole connected to said common connected ends of said coils and its positive pole connected to said contact means;
said contact means being adapted to alternately connect said supply voltage source to reverse bias one or the other but not simultaneously both said first and second blocking diodes.

4. A relay flip-flop as set forth in claim 3 having a set input terminal to receive a set input signal connected to said input end of said energizing coil with a set isolating diode blocking conduction of said set signal to said first capacitor; and a reset input terminal to receive a reset input signal connected to said input end of said deenergizing coil with a reset isolating diode blocking conduction of said reset signal to said second capacitor.

5. A relay flip-flop as set forth in claim 3 having current limiting resistors connected around each of said capacitors as discharge paths for said capacitors.

6. A relay flip-flop as set forth in claim 3 wherein said contact means includes a single-pole-double-throw type of contact having a common contact and two stationary contacts, with said common contact being connected to said biasing source, one of said stationary contacts being connected between said first blocking diode and said first capacitor, and the other of said stationary contacts being connected to said second diode and said second capacitor.

References Cited

UNITED STATES PATENTS

| | | | |
|---|---|---|---|
| 3,189,794 | 6/1965 | Currie | 317—155.5 X |
| 3,206,653 | 9/1965 | MacArthur | 317—155.5 |

LEE T. HIX, *Primary Examiner.*